United States Patent Office.

JAMES NEELY AND SIMEON ALLEN, OF BUCKINGHAM COUNTY, VIRGINIA.

Letters Patent No. 65,108, dated May 28, 1867.

IMPROVEMENT IN THE MANUFACTURE OF ALCOHOLIC SPIRITS.

*The Schedule referred to in these Letters Patent and making part of the same.*

TO ALL WHOM IT MAY CONCERN:

Be it known that we, JAMES NEELY and SIMEON ALLEN, of Buckingham county, State of Virginia, have discovered new properties in the juice of the stalks of maize or Indian corn, and that it may be readily distilled, producing Alcohol or Spirituous Liquors; and we do hereby declare the following to be a full and exact description of the same.

The stalk of the maize or Indian corn is cut at any time from the commencement of the stage in its growth known as the dough state till it is dry. The juice is expressed in any of the ordinary modes used for expressing the juice of sugar-cane or sorghum. The juice is then set in any convenient vessels where the temperature will be favorable to vinous fermentation; and when this has become fully established, the liquor is ready for distillation in the ordinary way of distilling cider for brandy. In warm weather the distillation may follow close upon the grinding and expression of the juice.

The yield of proof-spirits or of alcohol from the juice of course varies with the qualities of the stalk and time of cutting; but under favorable circumstances the yield of proof spirits will be one gallon or upwards from every six of the raw juice; and the yield of the juice from the stalk is nearly or quite equal to the yield of juice from sorghum. The spirituous liquor thus produced we believe to be as well adapted to medicinal uses and as pleasant and wholesome as a beverage as whiskey or brandy made from any other material. The yield from any breadth of land cultivated will be, in alcoholic liquors, double or more of what could be made from the ripe corn from the same land. The discovery is one tending to benefit humanity, in that it may lead to the disuse of ripe and nutritious grains for distillation.

The shoots may be stripped from the stalk, so as to prevent the formation of ears. This, we think, gives more yield of alcohol to the acre, and would probably be the advisable course where the ears would be of little or no account as fodder for stock. A person having use for the ears would find it better to allow the shoots to grow and form ears, which would be stripped or gathered from the stalks before they are expressed for the juice, these ears being nearly equal to ripe corn for fattening stock.

What we claim as our discovery and invention, and desire to secure by Letters Patent, is—

1. We claim the manufacture of spirituous liquors and alcohol from the juice of maize or Indian corn, substantially as herein set forth.

2. We claim, as a new article of manufacture, spirituous liquors or alcohol made from the expressed juice of corn stalks.

JAMES NEELY,
SIMEON ALLEN.

Witnesses:
  THOS. H. RICE,
  R. H. SPENCER.